US009939298B2

United States Patent
Gordon

(10) Patent No.: US 9,939,298 B2
(45) Date of Patent: Apr. 10, 2018

(54) PRESSURE RELIEF DETECTION FOR USE WITH GAS STORAGE

(71) Applicant: Nuvera Fuel Cells, Inc., Billerica, MA (US)

(72) Inventor: Bryan Gordon, Goffstown, NH (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 377 days.

(21) Appl. No.: 14/459,499

(22) Filed: Aug. 14, 2014

(65) Prior Publication Data
US 2015/0053274 A1    Feb. 26, 2015

Related U.S. Application Data

(60) Provisional application No. 61/869,119, filed on Aug. 23, 2013.

(51) Int. Cl.
*G01F 1/34*        (2006.01)
*F17C 13/02*      (2006.01)

(52) U.S. Cl.
CPC ............... *G01F 1/34* (2013.01); *F17C 13/025* (2013.01); *F17C 2201/052* (2013.01); *F17C 2201/054* (2013.01); *F17C 2201/056* (2013.01); *F17C 2201/058* (2013.01); *F17C 2203/0639* (2013.01); *F17C 2203/0646* (2013.01);
(Continued)

(58) Field of Classification Search
None
See application file for complete search history.

(56) References Cited

U.S. PATENT DOCUMENTS

| | | | | |
|---|---|---|---|---|
| 4,032,337 A | * | 6/1977 | Boyer | ............... B22F 3/15 137/563 |
| 4,486,635 A | * | 12/1984 | de Calvino y Teijeiro | ............. H01H 33/91 218/57 |

(Continued)

FOREIGN PATENT DOCUMENTS

| | | |
|---|---|---|
| DE | 10 2006 009537 | 5/2007 |
| EP | 1 428 089 A2 | 6/2004 |

(Continued)

OTHER PUBLICATIONS

PCT International Search Report & Written Opinion issued in International Patent Application No. PCT/US2014/051049 dated Feb. 26, 2015.

*Primary Examiner* — Hezron E Williams
*Assistant Examiner* — Alex Devito
(74) *Attorney, Agent, or Firm* — Finnegan, Henderson, Farabow, Garrett & Dunner LLP.

(57) ABSTRACT

The present disclosure is directed to a method and system for detecting activation of a pressure relief device connected to a storage tank containing a pressurized gas. The method includes calculating a pressure relief device release rate based on a set of inputs, wherein the set of inputs includes at least one of a storage tank volume, a pressure relief set point, an orifice size of the pressure relief device, a gas density, and a reseat point for the pressure relief device. The method further includes monitoring the pressure within the storage tank and calculating a differential pressure reading over time, comparing the differential pressure reading over time to the pressure relief device release rate, and detecting a pressure relief device activation based on the comparison result.

15 Claims, 3 Drawing Sheets

(52) U.S. Cl.
CPC ............. *F17C 2203/0663* (2013.01); *F17C 2205/0332* (2013.01); *F17C 2205/0338* (2013.01); *F17C 2221/012* (2013.01); *F17C 2221/033* (2013.01); *F17C 2223/035* (2013.01); *F17C 2223/036* (2013.01); *F17C 2250/032* (2013.01); *F17C 2250/034* (2013.01); *F17C 2250/036* (2013.01); *F17C 2250/043* (2013.01); *F17C 2250/0434* (2013.01); *F17C 2250/072* (2013.01); *F17C 2260/026* (2013.01); *F17C 2260/042* (2013.01); *F17C 2260/044* (2013.01); *F17C 2270/0165* (2013.01); *F17C 2270/0184* (2013.01); *Y02E 60/321* (2013.01); *Y10T 137/0396* (2015.04); *Y10T 137/8326* (2015.04)

(56) References Cited

U.S. PATENT DOCUMENTS

| 2007/0006939 | A1* | 1/2007 | Clusserath | B67C 3/2628 141/40 |
|---|---|---|---|---|
| 2009/0288713 | A1 | 11/2009 | Hirakata | |
| 2010/0305883 | A1 | 12/2010 | Danzy | |

FOREIGN PATENT DOCUMENTS

| EP | 1 428 089 B1 | 6/2004 |
|---|---|---|
| EP | 2 180 304 A1 | 4/2010 |

* cited by examiner

PRESSURE RELIEF DETECTION FOR USE WITH GAS STORAGE

This application claims the benefit of U.S. Provisional Application No. 61/869,119, filed Aug. 23, 2013, which is incorporated herein by reference.

The present disclosure is directed towards pressure relief detection for use with gas storage, and more specifically, to detection and notification of activation of a pressure relief device.

Safe and effective gas storage requires various technologies to monitor a gas within a storage device. Some gases and storage systems require specific safety devices, depending on where and how a gas is stored. Gas usage may also require consideration. For example, hydrogen storage is required for the successful commercialization of hydrogen and fuel cell power technology in transportation, stationary, and portable applications. The long-term sustainability of a "hydrogen economy" depends largely on the efficiency, safety, and cost-effectiveness of hydrogen storage. Gaseous hydrogen is a convenient and common form of stored energy, usually by pressurized containment. Advantageously, storing hydrogen at high pressure yields higher energy density.

Hydrogen storage tanks can fall under four classifications, Type 1, Type 2, Type 3, and Type 4. Each tank has a different maximum pressure capacity based on the materials of construction; Type 1 is rated for the lowest pressure and Type 4 is rated for the highest pressure. For example, a Type 1 tank made of steel can have a maximum pressure rating of about 2,900 psi, while a Type IV tank made of plastic/carbon can have a maximum pressure rating of equal to or greater than 9,500 psi. In the last decade Type IV tanks have been used for hydrogen storage aboard fuel cell powered automobiles manufactured by several major automakers.

Hydrogen storage tanks for use in stationary and mobile vehicles require an integrated pressure relief valve (PRV) configured to prevent over-pressurization of the tank and supporting components in the event of a control element failure, fire, or blocked flow. Typically these PRVs are required to be American Society of Mechanical Engineers (ASME) or Department of Transportation (DOT) certified depending on the tank's application. One challenge with regard to simple PRVs is a lack of ability to detect and have a control system react appropriately in the event of a PRV activation caused by over-pressurization. The ability for a control system to detect activation could enable specific control system reactions, for example, in the case of a bulk storage system; a control system reaction can prevent supplying additional hydrogen to the storage system. In the case of a mobile application, the control system reaction can stop the consumption of fuel and have the vehicle react appropriately. In addition, the ability to detect activation by the control system can allow the control system to send notification to a customer, user, or service personnel.

Lately, more intelligent PRVs have been developed, which use integrated proximity switches to detect the activation of the PRV. However, these PRVs are more complicated, costly, and not available for high pressure applications. Currently, the intelligent PRVs available are not rated for high pressure applications (i.e., pressures greater than 5,000 psi). In addition, reliability is a concern, because these PRVs can give false activations. Improved systems, devices and methods are thus needed to detect activation of pressure relief in gases stored at high pressures.

In consideration of the aforementioned circumstances, the present disclosure is directed towards a new method and system for pressure relief device activation detection for use with pressurized gas storage. The method and system are configurable for specific gases used in high pressure applications.

One embodiment of the present disclosure is directed to a method of detecting activation of a pressure relief device connected to a storage tank containing a pressurized gas. The method comprises calculating a pressure relief device release rate based on a set of inputs, wherein the set of inputs includes at least one of a storage tank volume, a pressure relief set point, an orifice size of the pressure relief device, a gas density, and a reseat point for the pressure relief device. The method further includes monitoring the pressure within the storage tank and calculating a differential pressure reading over time, comparing the differential pressure reading over time to the pressure relief device release rate, and detecting a pressure relief device activation based on the comparison result.

In another embodiment, the calculation of the pressure relief device release rate is based on choked flow equations for the pressure relief device. In another embodiment, calculating the differential pressure reading over time is repeated and the differential pressure values are averaged over time. In another embodiment, the method further comprises activating a system alarm following detection of the pressure relief device activation.

In another embodiment, detecting the pressure relief device activation based on the comparison result comprises identifying when the differential pressure reading over time is greater than or equal to the pressure relief device release rate. In another embodiment, calculating the pressure relief device release rate further comprises factoring in the position of a regulating device configured to discharge the pressurized gas during normal operation.

Another embodiment of the present disclosure is directed to a controller for detecting activation of a pressure relief device connected to a storage tank containing a pressurized gas. The controller comprises a processor configured to receive an input of the pressure reading from a pressure transducer, calculate a differential pressure reading over time and compare the differential pressure reading over time to a pressure relief device release rate determined based on a set of inputs, and based on the comparison the controller detects whether a pressure relief device activation has occurred, wherein the pressure transducer is located upstream of the pressure relief device and the pressure within the storage tank is about greater than about 10,000 psi. In another embodiment, the controller further comprises a graphical user interface, a memory device, and a power source. In another embodiment, the set of inputs includes at least one of a storage tank volume, a pressure relief set point, an orifice size of the pressure relief device, a gas density, and a reseat point for the pressure relief device.

Another embodiment of the present disclosure is directed to a system configured to detect pressure relief. The system comprises at least one storage tank configured to contain a gas, a pressure transducer configured to read the pressure of the gas, a pressure regulating device configured to control the discharge of the gas during normal operation, a pressure relief device configured to activate and discharge the gas to prevent an over-pressurization of the storage tank, and a controller configured to receive the pressure reading from the pressure transducer, calculate a differential pressure reading over time and compare the differential pressure reading over time to a pressure relief device release rate determined based on a set of inputs, and based on the comparison the controller detects whether the pressure relief device has been activated.

In another embodiment, the controller further comprises a processor, a graphical user interface, a memory device, and a power source. In another embodiment, the set of inputs includes the storage tank volume, a pressure relief set point, an orifice size of the pressure relief device, the gas density, and a reseat point for the pressure relief device. In another embodiment, the calculation of the pressure relief device release rate is based on choked flow equations for the pressure relief device. In another embodiment, calculating the differential pressure reading over time is repeated and the results are averaged over time. In another embodiment, the controller is further configured to activate a system alarm following detecting the pressure relief device activation, and the system alarm is configured to provide notification to at least the proper personnel or system to respond. In another embodiment, the controller is configured to factor in the position of a regulating device configured to discharge the pressurized gas during normal operation when calculating the pressure relief device release rate. In another embodiment, the pressure relief device orifice cross-sectional area is greater than the cross-sectional area of the pressure regulating device orifice.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to hydrogen storage, it is understood that the methods and systems of the present disclosure can be employed with various types of pressurized storage systems. For example, pressurized gas storage of natural gas, nitrogen, carbon monoxide, helium, argon, carbon dioxide, chlorine, oxygen, and other like gas.

Figure 1:
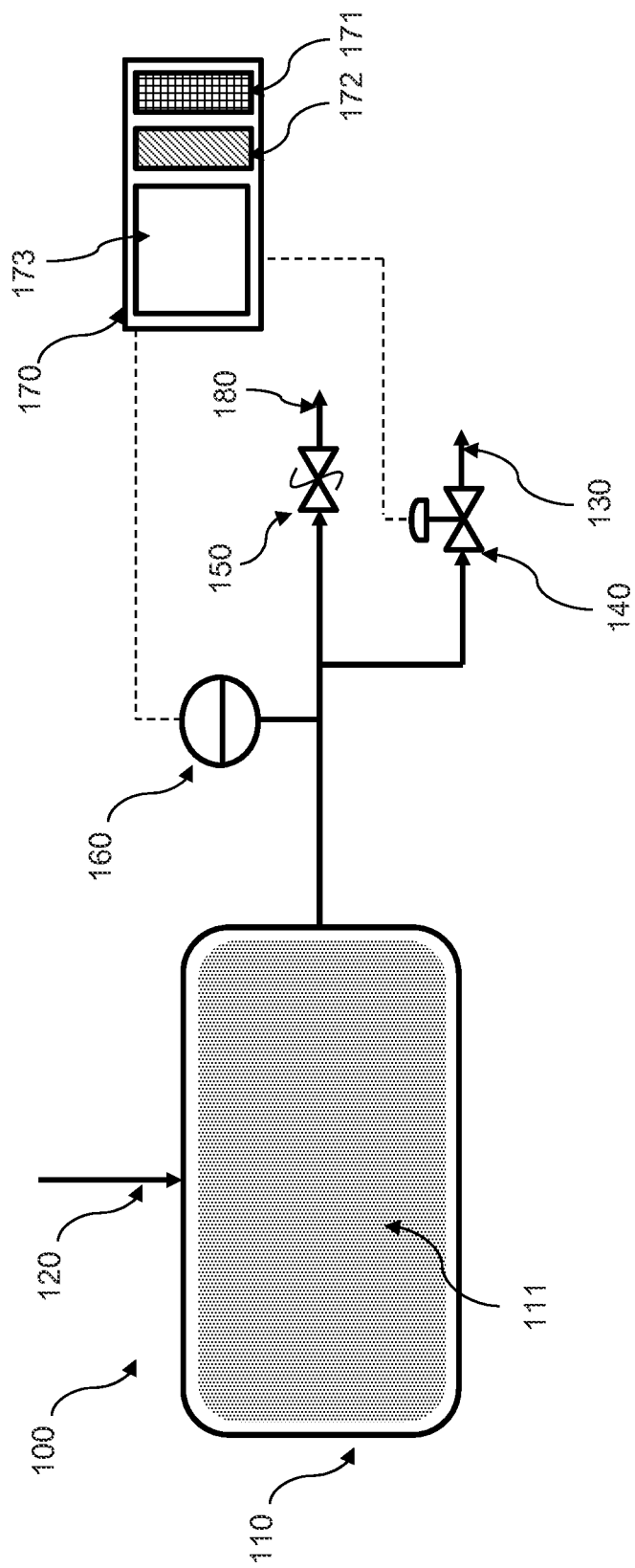
FIG. 1 is a schematic diagram of part of a storage system, according to an exemplary embodiment.

FIG. 1 shows a portion of a storage tank system 100, according to an exemplary embodiment. Storage tank system 100 can comprise a storage tank 110, an inlet passage 120, an outlet passage 130, a regulating device 140, a pressure relief device 150 (PRD), a pressure transducer 160, a controller 170, and an exhaust passage 180.

Storage tank 110 can be configured to receive, store, and discharge a gas 111. Gas 111 can include an energy source, such as, for example hydrogen gas or natural gas. Storage tank 110 can be formed of metal (e.g. steel or aluminum), plastic, composites, carbon fiber, or other materials. Storage tank 110 can have a maximum pressure capacity of about 5,000 psi, 10,000 psi or 15,000 psi and above. Storage tank 110 can have a volume of about 1 liter, 2 liters, 5 liters, 10 liters, 50 liters, 100 liters, 1,000 liters, 10,000, or 50,000 liters and above. Storage tank 110 can be formed of a single chamber or a plurality of chambers (not shown). The plurality of chambers can be isolated by valves or in fluid communication. Within the plurality of tanks gas can be stored at different pressures. For example, there can be low pressure storage tanks, medium pressure storage tanks, and high pressure storage tanks. For example, for an industrial application, the low pressure to high pressure range can be about 500 psi to about 6,500 psi and for an automotive application; the low pressure to high pressure range can be about 2,000 psi to about 15,000 psi.

Inlet passage 120 can be configured to allow gas 111 flow into storage tank 110. Inlet passage 120 can be configured to be a single inlet or a plurality of inlets. For a bulk storage system, inlet passage 120 can be configured to be in fluid communication with a gas generation supply source (not shown). For example, in the case of a hydrogen storage system, inlet passage 120 can be in fluid communication with a hydrogen compression system (e.g., electrochemical hydrogen compressor), high pressure electrolyze, or other similar gas compressor or source. For a mobile vehicle application, inlet passage 120 can be configured to receive a refueling line connection, such as, for example, a refueling nozzle (not shown).

Outlet passage 130 can be configured to discharge gas 111 from storage tank 110. For a bulk storage system application, outlet passage 130 can be the refueling connection used to refuel the storage tanks within a mobile vehicle. For a mobile vehicle application, outlet passage 130 can be configured to feed a vehicle engine or fuel cell Outlet passage 130 can also be configured to connect to a vehicle storage tank in the case of a stationary storage application. In other embodiments, outlet passage 130 can be configured to operate as both the inlet passage and outlet passage. In which case, a bypass (not shown) around regulating device 140 can be configured to allow for reverse flow and a check valve (not shown) can be installed in the line.

Regulating device 140 can be located between storage tank 110 and outlet passage 130. Regulating device 140 can be configured to control the discharge pressure and/or flow of gas 111 from storage tank 110. For example, regulating device 140 can take the form of a control valve (e.g., ball valve, butterfly valve, needle valve, gate valve, stem valve or diaphragm valve). Regulating device 140 can contain an orifice/opening, which cross-sectional area can vary based on the percent open.

According to various embodiments, regulating device 140 can be configured to fully close and isolate gas 111 within storage tank 110 from outlet passage 130. Regulating device 140 can be configured to communicate with controller 170. For example, controller 170 can receive position information from regulating device 140 (i.e., open, closed, percent open, etc.).

As shown in FIG. 1, pressure transducer 160 can be located between storage tank 110 and regulating device 140 and be in fluid communication with both. Pressure transducer 160 can be configured to read a pressure associated with gas 111 within storage tank 110. Pressure transducer 160 can be configured to read the pressure of gas 111 continuously or periodically. Pressure transducer 160 can be configured to continuously or intermittingly transmit the pressure reading to controller 170.

As shown in FIG. 1, downstream of pressure transducer 160 can be an auxiliary line comprising PRD 150 and exhaust passage 180. PRD 150 can be configured to discharge gas 111 through exhaust passage 180 when active (i.e., open) and isolate exhaust passage 180 from storage tank 110 when deactive (i.e., closed).

Figure 2:
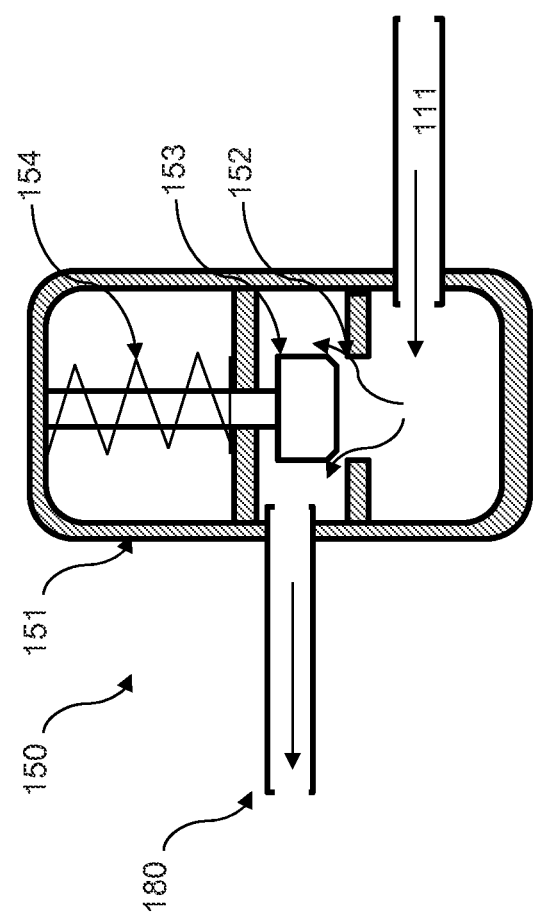
FIG. 2 is a schematic diagram of part of a pressure relief device, according to an exemplary embodiment.

According to an exemplary embodiment, as shown in FIG. 2, PRD 150 can comprise a body 151, an orifice 152, a disk 153, and a spring 154. Spring 154 can apply a force on disk 153 and block orifice 152. The force applied by spring 154 can be adjusted. PRD 150 can be configured to prevent over-pressurization of storage tank system 100 by allowing gas 111 to flow out through exhaust passage 180 when the pressure of gas 111 exceeds a predetermined pressure limit set point.

According to various embodiments, the cross-sectional area of orifice 152 is greater than the cross-sectional area of the orifice/opening of regulating device 140. Therefore, when the pressure limit set point is exceeded, flow through orifice 152 and out exhaust passage 180 can be the path of least resistance.

According to various embodiments, when the pressure of gas 111 drops below the pressure limit set point, the spring force can cause disk 153 to reseat, blocking orifice 152 and stopping the flow of gas 111 through PRD 150 and exhaust passage 180.

As shown in FIG. 1, according to an exemplary embodiment, controller 170 can be comprised of a processor 171, memory device 172, and a graphical user interface (GUI) 173. Controller 170 can be configured to receive inputs from instrumentation (e.g. sensors, valves, control devices, etc.) in addition to receiving programmed inputs from a user or operator by way of the GUI 173. Controller 170 can be configured to monitor instrumentation readings at a set interval, for example, every 1 second, 0.1 seconds, 0.01 seconds, or 0.001 seconds. Communication between controller 170 and pressure transducer 160, and regulating device 140 can be by control wiring using current/voltage (e.g., 4-20 ma signal or 1-10 VDC signal), field bus communication (e.g., PROFIBUS or MODBUS), pulse/frequency protocol, Wi-Fi, or Bluetooth®.

GUI 173 can allow a user to program a set of inputs that can include a storage tank 110 volume, a pressure relief set point, an orifice size for PRD 150, gas 111 density, and reseat point for PRD 150. The pressure relief set point can be based on the maximum allowable operating pressure of the system (i.e., storage tank, piping, components, etc.) According to various other embodiments, controller 150 can be configured to detect at least one or more of the set of inputs directly from the devices using smart instrumentation hardware configured to communicate using a form of field bus communication. In yet another embodiment, controller 170 can include a programmable logic controller (PLC) configured to communication with a human machine interface (HMI) or other PLC on a common network and at least some of the inputs can be received as inputs from another controller or PLC.

According to an exemplary embodiment, a pressure relief device release rate can be calculated for a given PRD 150. Choked orifice flow calculations can be used to calculate a pressure relief device release rate from a set of input variables.

The set of input variables can include storage tank 110 volume, pressure relief set point, PRD 150 orifice size, gas 111 density, and reseat point for PRD 150. Based on these inputs a pressure relief device release rate for PRD 150 can be calculated. Accordingly, if the effective orifice size of PRD 150 is greater than the maximum effective orifice size of regulating device 140, then dP/dt during normal operation (i.e., flow through regulating device 140) will be smaller than release rate during a PRD 150 release. This can allow the calculated release rate for PRD 150 to be used as an alarm or set point in control logic to detect if PRD 150 has been activated.

As described above, according to an exemplary embodiment, controller 170 can execute the calculations to determine the release rate value for PRD 150. According to other embodiments, the calculation of the release rate value can be performed and then the value can be sent to controller 170 as an input signal or programmed by a user through GUI 173.

EXAMPLE 1

The following example outlines the equations and steps that can be used to calculate the pressure relief device release rate. For the following example the gas is assumed to be hydrogen. Table 1 shown below identifies the units used for the calculation and Table 2 identifies the indices.

TABLE 1

| Unit Identifier | Unit Measurement | Description |
|---|---|---|
| V | $m^3$ | Volume |
| P | kPa, Pa, MPa | Absolute pressure in the noted values |
| T | ° C., K | Temperature in the noted values |
| ρ | $kg/m^3$ | Real gas density |
| $ρ_{molar}$ | Mol/L | Real molar density |
| k | Dimensionless | Ratio of specific heats (Cp/Cv) Assumed to be 1.41 for hydrogen at standard conditions |
| Z | Dimensionless | Compressibility Factor |
| R | J/mK | Universal Gas Constant of 8.3144621 |
| $\overline{R}$ | J/kgK | Specific Gas Constant |
| C | Dimensionless | Coefficient of Discharge |
| A | $m^2$ | Area in meters squared |
| $\dot{m}$ | kg/sec | Mass flow rate |
| t | Seconds | Time |
| Q | $m^3$/sec | Volumetric flow rate |
| MW | g/mol | Molecular Weight |
| π | Dimensionless | Pi - Ratio of a circles circumference to the diameter - 3.14156 |

TABLE 2

| Indices | Description |
|---|---|
| Crit | Critical |
| i | Inlet Condition |
| o | Outlet Condition |
| Ori | Orifice |
| c | Choked conditions |
| nc | Non-choked conditions |
| Vessel | Hydrogen Supply Vessel |
| Reseat | Reseat |
| Result | Resultant |
| initial | Initial Condition |
| final | Final Condition |
| release | Conditions after a pressure relief valve device activates |

The process for calculating the pressure relief device release rate can be described in several sections. The first section can comprise determining the input conditions for the calculations (i.e., vessel initial conditions, critical pressure ration, orifice area), the second section can comprise the orifice equations (i.e., discharge coefficients, choked flow equation, and non-choke flow equation), the third section can comprise dynamically analyzing the PRD release (i.e., determining the resultant vessel pressure after Time=i, determining orifice conditions after Time=i, and iterative modeling), and the four section can comprise of determining the PRD release rate set point. Lastly, the calculations can also factor in the additional gas consumers and suppliers.

Initial Vessel/Storage Tank Conditions:

The initial conditions can be defined as the state that the vessel is in before the pressure release occurs. The following equations can be used to determine the initial vessel conditions.

Vessel/Storage Tank Volume:

$$V_{vessel} = V_{cylinder} \times \text{Number of Cylinders} \quad (1)$$

Density of Hydrogen Gas:

Hydrogen does not behave in the ideal gas realm, therefore the real gas density needs to be calculated from the equation of state, see, e.g., "Revised Standardized Equation of State for Hydrogen Gas Densities for Fuel Consumption Applications," E. W. Lemmon, M. L. Huber, J. W. Leachman, *J. Res. Natl. Inst. Stand. Technol.* 113, 341-350 (2008). This equation utilizes the ideal gas equation and corrects for real gas by calculating the compressibility factor for a given pressure and temperature condition.

$$Z = 1 + \sum_{i=1}^{9} a_i \left[\frac{100 \text{ K}}{T}\right]^{B_i} \left[\frac{P(\text{MPa})}{1 \text{ MPa}}\right]^{C_i} \quad (2)$$

For equation 2 above, T is the temperature of the gas in the storage vessel in Kelvin and P is the pressure of the gas in the vessels in MPA. For analysis purpose temperature can be assumed to be the ambient temperature or worst case conditions for a pressure relief device release (i.e., lowest operating temperature). The constants $a_i$, $B_i$, and $C_i$ are defined in the (Lemmon, Huber, & Leachman, 2008) and are shown below in Table 3 below.

TABLE 3

| i | $a_i$ | $b_i$ | $c_i$ |
|---|---|---|---|
| 1 | 0.058 884 60 | 1.325 | 1.0 |
| 2 | −0.061 361 11 | 1.87 | 1.0 |
| 3 | −0.002 650 473 | 2.5 | 2.0 |
| 4 | 0.002 731 125 | 2.8 | 2.0 |
| 5 | 0.001 802 374 | 2.938 | 2.42 |
| 6 | −0.001 150 707 | 3.14 | 2.63 |
| 7 | 0.958 852 8 × $10^{-4}$ | 3.37 | 3.0 |
| 8 | −0.110 904 0 × $10^{-6}$ | 3.75 | 4.0 |
| 9 | 0.126 440 3 × $10^{-9}$ | 4.0 | 5.0 |

Once the compressibility factor is determined, the density can be calculated using the ideal gas law, shown below as equation 3.

$$\rho_{mol} = \frac{P_{vessel}}{ZRT_{vessel}} \quad (3)$$

For equation 3, P is the pressure of the gas inside the vessel in MPa, Z is the compressibility factor calculated from equation 2, R is the universal gas constant and T is the temperature of the gas inside the vessel in degrees Kelvin.

Equation 4 shown below can be used to convert the molar based density from equation 3 to a mass based density (kilograms per cubic meter).

$$\rho_{initial\ Vessel} = (\rho_{mol} \times MW_{hydrogen}) \times \left(\frac{\text{kg}}{1000 \text{ grams}}\right) \quad (4)$$

For equation 4, the molecular weight of hydrogen is equal to 2.01588 grams per mole.

Initial Vessel Mass:

Equation 5 shown below can be used to determine initial mass. Equation 5 provides the total mass of the hydrogen gas in the vessel at initial conditions in kilograms.

$$m_{Vessel\ initial} = \rho_{initial\ vessel} \times V_{vessel} \quad (5)$$

Orifice Area:

The orifice area can refer to the discharge area of the pressure relief device when opened. Typically manufacturers provide the diameter of the orifice, but in the case that the diameter is not provided, one can interpolate the orifice diameter based on flow curves or the device Cv. For the purposes of this example, it is assumed that the diameter of the orifice is given and equation 6 below can be used to calculate the area. In equation 6 below, A is the area of the orifice in meters squared, and R is the radius of the orifice diameter.

$$A_{ori} = \pi R_{orifice}^2 \quad (6)$$

Critical Pressure:

Assuming steady state behavior, critical pressure is the state at which the upstream pressure is great enough to cause choked flow. This equation assumes that the downstream conditions of the orifice are close to standard conditions. In equation 7 below, the inlet pressure is in kPa and k is the specific heat ration (Cp/Cv). Since hydrogen is a non-ideal gas, the specific heat ratio changes as a function of pressure and temperature. Look up tables can be used to determine the exact value based on the state of the system in respect to time.

$$P_{Crit} = P_i \left(\frac{2}{k+1}\right)^{\left(\frac{k}{k-1}\right)} \quad (7)$$

Orifice Equations:

The orifice equations can be used in the model to determine the real gas flow through the pressure relief device assuming the downstream environment is at atmospheric conditions. Typically during a release, the flow through the pressure relief device will start in the choked flow conditions, and then possibly transfer to the non-choked flow conditions depending on the orifice size. Generally for an ASME or DOT stamped PRD that is designed for fire or blocked flow, the PRD will reseat before the flow exits choked conditions.

Discharge Coefficient:

The discharge coefficient is a dimensionless number that is the relation of real flow vs. theoretical flow through an orifice. This number can typically be determined imperially or by means of look-up tables. Many forms of tables can be obtained from books, internet, etc. Typically the tables provide analysis as a function of the diameter ratio and the Reynolds number. Table 4 shown below is an example of a typical table. For this analysis, the discharge coefficient is 0.60.

TABLE 4

| Diameter Ratio | Discharge Coefficient - $c_d$ | | | |
|---|---|---|---|---|
| | Reynolds Number - Re | | | |
| $d = D_2/D_1$ | 1.00E+05 | 1.00E+06 | 1.00E+07 | 1.00E+08 |
| 0.2 | 0.6 | 0.595 | 0.594 | 0.594 |
| 0.4 | 0.61 | 0.603 | 0.598 | 0.598 |
| 0.5 | 0.62 | 0.608 | 0.603 | 0.603 |
| 0.6 | 0.63 | 0.61 | 0.608 | 0.608 |
| 0.7 | 0.64 | 0.614 | 0.609 | 0.609 |

(Orifice, Nozzle and Venturi Flow Rate Meters)

Choked Flow Equation:

Equation 8 shown below can be used to determine the mass flow rate through an orifice in kilograms per second at choked flow conditions. For equation 8, inlet pressure is the pressure of the vessel, inlet density is the density of the gas inside the vessel and k is the ratio of specific heats.

$$\dot{m}_c = CA_{ori}\sqrt{kP_i\rho_i\left(\frac{2}{k+1}\right)^{\left(\frac{k+1}{k-1}\right)}} \qquad (8)$$

Non-Choked Flow Equation:

Equation 9 shown below can be used to determine the mass flow rate through an orifice in kilograms per second at non-choked conditions. For equation 9, inlet pressure is the pressure of the vessel, inlet density is the density of the gas inside the vessel, outlet pressure is the downstream pressure of the orifice and k is the ratio of specific heats.

$$\dot{m}_{nc} = CA_{ori}\sqrt{2P_i\rho_i\left(\frac{k}{k-1}\right)\left[\left(\frac{P_o}{P_i}\right)^{\frac{2}{k}} \times \left(\frac{P_o}{P_i}\right)^{\frac{k+1}{k}}\right]} \qquad (9)$$

Determining Choked Vs. Non Choked Flow Rates:

The actual flow rate through the orifice is dependent on if the conditions are choked or non-choked. This can be determined using the critical pressure calculated by equation 7. Based on this, the following "if statement" can be used to determine the actual flow through the orifice.

IF $P_i > P_{crit}$ Then $\dot{m} = \dot{m}_c$

Else $\dot{m} = \dot{m}_{nc}$

Dynamic Analysis of a Pressure Relief Device Release

A PRD activation can result in mass being removed from the vessel as a function of time. For this analysis, the basic equation for mass balance can be used.

$$m_{vessel}(t) = \int_{t=o}^{t=i} dm(t) - m_{vessel} \qquad (10)$$

In respect to time=1 second, the equation can be represented by:

$$m_{vessel_{Result}} = \dot{m}(t_2 - t_1) - m_{vessel} \qquad (11)$$

For equation 10 and 11, dm is the mass removed by the orifice based on equations 8, 9, and 10 for the given time of i. Once the final vessel mass has been analyzed, a recalculation of vessel pressure based on the equations below can be done.

Determining Vessel Density at Time=i:

The volume of the vessel can be assumed static, therefore, the following equation can be used to determine the resultant density after time i.

$$\rho_i = \frac{m_{vessel}(t=i)}{V_{vessel}} \qquad (12)$$

Determining Resultant Vessel Pressure After Time=i:

To determine the pressure at time=i, a formation of the NIST equation of state can be used, which is based on plot fit data from the National Institute of Standards and Technology's Thermo-physical Web Book (http://webbook.nist.gov/chemistry/fluid/). For equation 13 below, T is the temperature of the gas in Kelvin (assumed to be the same as the initial condition at t=0), rho is the density of the gas at time=i, and P is the resultant pressure in kPa.

$$P = (T^{cb} \times Bb \times \rho) + ((Ac + Bc \times T + cc \times T^2 + Dc \times T^3)\rho^2) + ((Ad + Bd \times T + Cd \times T^2 + Dd \times T^3)\rho^3) \qquad (13)$$

The following constants shown in TABLE 5 below can be used in equation 13.

TABLE 5

| Constant | Value |
|---|---|
| Bb | 4.7712 |
| Cb | 0.97583 |
| Ac | −13.129 |
| Bc | 0.10223 |
| Cc | −1.4128e−4 |
| Dc | 1.0819e−7 |
| Ad | 0.15844 |
| Bd | −1.9664e−4 |
| Cd | 7.9948e−7 |
| Dd | −6.2384e−10 |

Determining Orifice Conditions After Time=i:

Once pressure has been calculated as a result in the loss of mass from the storage vessel caused by the pressure relief device activation, one can re-analyze the orifice equations 8, 9 and 10 to determine what the resultant mass flow rate can be.

Iterative Modeling:

Once the resultant orifice conditions are analyzed, time can be reset to 0 and the next iteration is performed using equations 11, 12, and 13. This set can be repeated until the vessel pressure equals that of the pressure relief device or the vessel is empty.

Determining PRD Release Set Point:

Once the analysis is performed, analysis of the change in vessel pressure as a function of time can be done. Based on the information, the dP/dt value for the specific pressure relief device can be determined and programmed into the control system.

$$P_{Release} = \frac{dP}{dt} \text{ storage system} \qquad (14)$$

Modeling for Effect of Additional Hydrogen Consumers or Supplies

If the system has additional consumers (e.g., dispenser, fuel cell, or customer) or supply sources (e.g., hydrogen generator), equation 10 will have to be modified to account for these variations in resultant mass of the vessel after time=i.

$$m_{vessel}(t) = \int_{t=0}^{t=i}(dm(t)_{supply} + dm(t)_{PRV} + dm(t)_{Consumer})) - m_{vessel} \qquad (15)$$

For this example, the combination of all consumer(s) should not exceed the maximum mass flow rate of the orifice inside the pressure relief device. Otherwise, the alarm may activate when the PRD release condition does not exist.

Figure 3:
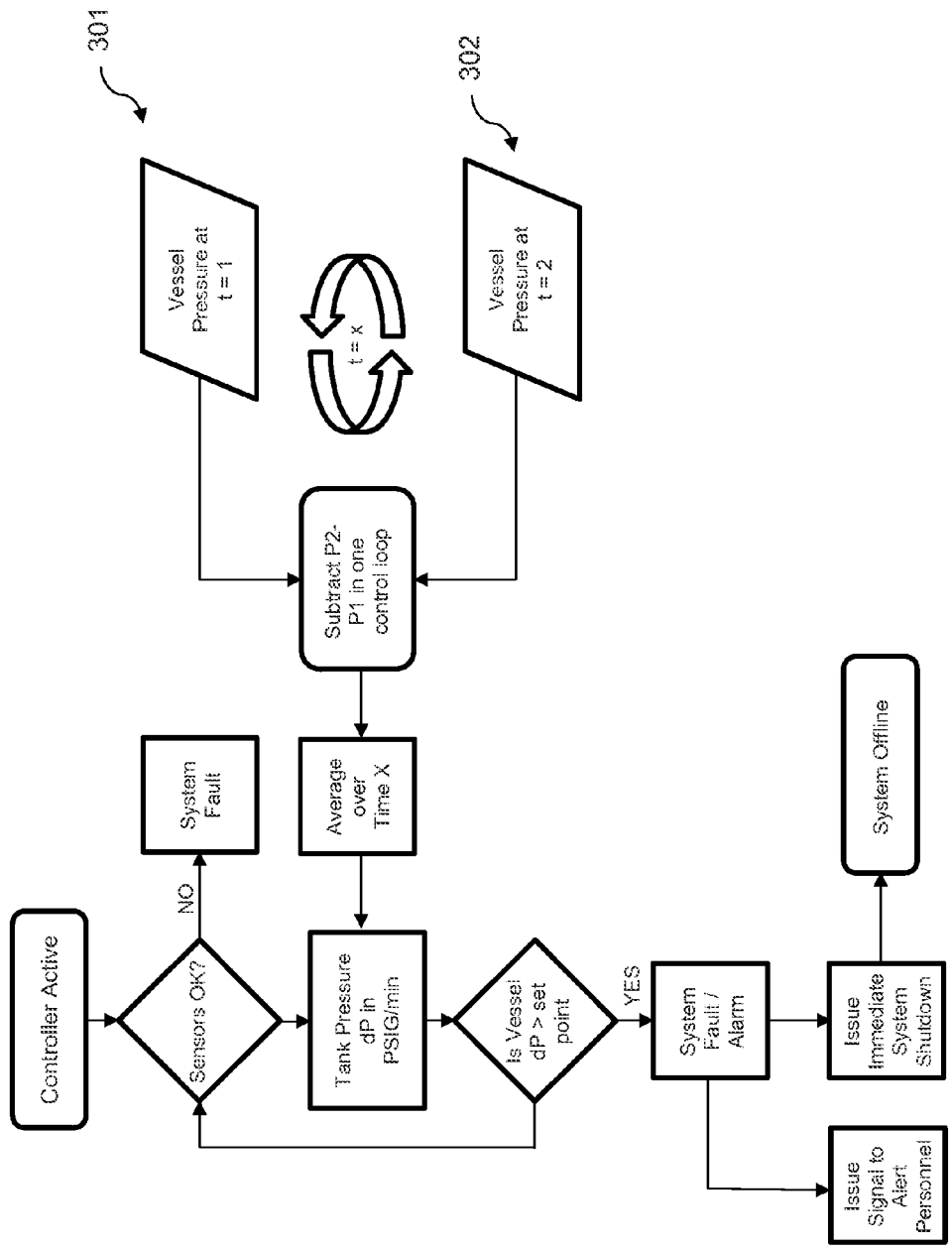
FIG. 3 is a flow diagram for control logic, according to an exemplary embodiment.

FIG. 3 shows a flow diagram for part of the control logic of controller 170, according to an exemplary embodiment. The control logic is configured to detect if PRD 150 has been activated and if so, provide proper notification. Initially, when controller 170 is active, a system check can be run to confirm inputs (e.g., instrumentation, valves) are operating properly. The system check can comprise of confirming the voltage, current, handshake signal, or other signal from the instrumentation is within the expected range. If the signal is not within the programmed range, the system can fault, as shown in FIG. 3

Once controller 170 completes the system check, the process of monitoring storage tank 110 pressure can commence. Controller 170 can record the pressure reading of storage tank 110 pressure from pressure transducer 160 at control loop time 1 (301). Subsequently, controller 170 can then record storage tank 110 pressure again at control loop time 2 (302). These two recorded pressure values can then be subtracted to get a differential pressure dP value. As shown in FIG. 3, the control loop can be repeated and controller 180 can average these dP values over time x resulting in a moving average dP/dt reading. As described above, during normal operation (i.e., gas 111 flowing through regulating device 140) the dP/dt reading should be less than the calculated release rate for a PRD 150 release.

As shown in FIG. 3, the average dP/dt reading can be compared to the calculated PRD 150 release rate. The comparison function can be executed continuously or intermittently. Subsequently, if the dP/dt reading becomes greater than the calculated pressure relief device release rate, the system will fault or alarm. Upon system fault or alarm, an immediate shutdown can be initiated. In addition, during the shutdown, controller 170 can be configured to alert personnel that the system has experienced an issue, which can prompt a proper response.

In other embodiments, following a system fault or alarm, controller 170 can be confirmed to open or close valves or control other system components in a sequence designed to safely relieve the pressure from the tank. In addition, the sequence can be configured to bleed the pressure to a dump chamber (not shown) designed to receive the gas 111 during an emergency shutdown. The dump chamber can limit the amount of gas 111 that can be exhausted to atmosphere.

In other embodiments, controller 170 can be configured to receive a signal from regulating valve 140 indicating the current percent open position of the valve. Controller 170 can use the current percent open position to calculate a present dP/dt for regulating valve 140. Subsequently, the present dP/dt for the regulating valve 140 can be factored into the pressure relief device release rate set point, which triggers the system fault/alarm.

For example, if regulating valve 140 is significantly throttled and minimal flow is exiting through outlet passage 130, then an activation of PRD 150 would result in a release rate, which is almost entirely a result of flow out exhaust 180. As a result, the measured dP/dt versus the calculated release rate could be almost equal. Moreover, the margin of error for the pressure transducer, calculation rounding, or instrumentation scaling could cause the measured dP/dt to be below the calculated release rate in the final control logic comparison function, preventing the triggering of the system fault/alarm despite the actual activation of PRD 150 (i.e., false negative). Therefore, by using the present dP/dt for regulating valve 140, controller 170 can adjust the release rate set point appropriately to prevent false negatives.

Activation of PRD 150 can be a result of a variety of circumstances. For example, a control element failure, fire, blocked flow, or excess inlet flow can all cause situations of over-pressurization. Controller 170 can be configured to detect and then signal or notify the appropriate persons or system(s). For example, controller 170 can be configured in a commercial storage application to send a signal to a fire panel upon detection so the proper emergency personnel can respond. In yet another embodiment, controller 170 can be configured to trigger an emergency shutdown and initiate a switch over to an auxiliary hydrogen storage system upon detection of pressure relief device activation within the primary hydrogen storage system.

Storage tank system 100 and the control method as described above can be used in many applications. For example, the system and method can be used for bulk station storage of pressurized gases (e.g., hydrogen or compressed natural gas). The bulk storage could be a refueling station for mobile vehicles. Yet another example of an application could be on board hydrogen storage vessels used with hydrogen combustion engines or proton exchange membrane (PEM) fuel cells in vehicles.

In other embodiments, the system and method as described above can be used to detect line break between the storage tank and downstream and upstream components. In other embodiments, the system and method as described above can be used with a system receiving, storing, and discharging a fluid, wherein the fluid is a compressible fluid.

In other embodiments, rupture disks can be utilized in place of pressure relief device 150 as described above. It is contemplated that other forms of pressure relief devices may also be utilized in conjunction with the present disclosure.

In other embodiments, a storage tank system can include a plurality of storage tanks and a plurality of pressure relief devices and corresponding pressure transmitters. The pressure relief devices and pressure transmitters can be position in locations susceptible to over-pressurization due to control element failure. In systems utilizing a plurality of pressure relief devices a single controller can be used or a plurality of controllers can be used and the plurality of controllers can be configured to communication.

EXAMPLE 2

The system and method as described above can be utilized in a stationary bulk storage tank system. The storage tank system of the current example can be configured to receive, store, and distribute hydrogen. The storage tank system can comprise three storage tanks, wherein the first storage tank is a high pressure tank, the second storage tank is a medium pressure tank, and the third storage tank is low pressure tank. The storage tank system can further comprise a pressure transmitter ($PT_H$, $PT_M$, or $PT_L$) and a pressure relief device (PRD). The storage tank system can further comprise a controller configured to monitor the pressure of each of the pressure transmitters. The controller can be configured to sample the pressure reading from each transmitter at 200 ms intervals. In parallel with the sampling the controller can be configured to calculate a rolling average of the pressure change for $PT_H$, $PT_M$, or $PT_L$ over a period of 10 seconds. The calculation of the rolling average can be executed utilizing the equations shown below for each of the each pressure transmitter. The numbers of values listed in the matrix is not a complete representation of the total number of values that would be recorded and calculated during a 10 second period with a polling rate of 200 ms. The total number has been reduced to a small representative number.

Calculation for High Pressure Tank—$PT_H$ $$\begin{bmatrix} (P2_{Bank} - P1_{Bank}) \div (T2 - T1) \\ (P3_{Bank} - P2_{Bank}) \div (T3 - T2) \\ (P4_{Bank} - P3_{Bank}) \div (T4 - T3) \\ (P5_{Bank} - P4_{Bank}) \div (T5 - T4) \\ (P6_{Bank} - P5_{Bank}) \div (T6 - T5) \end{bmatrix} = \begin{bmatrix} P1_{Calc} \\ P2_{Calc} \\ P3_{Calc} \\ P4_{Calc} \\ P5_{Calc} \end{bmatrix} \quad (16)$$

The average rate of change (dP) can be calculated by the following equation:

$$\text{Avg } dP = \text{Average}(P1_{calc}, P2_{calc}, P3_{calc}, P4_{calc}, P5_{calc}) \quad (17)$$

The average rate of change over time dP/dt can be calculated using the following equation:

$$dP/dt = \text{Avg } dP * 60 \quad (18)$$

The above calculation can be executed for each storage tank pressure transmitters simultaneously as shown above for the high pressure tank.

The controller can then take the minimum of the three dP/dt values for the three storage tank pressure transmitters and compare this to the PRD release rate, which is a programmable variable based on the model of the PRD. If the minimum dP/dt value is greater than the PRD release rate than the controller can trigger the alarm indicating a PRD activation. The controller can continuously execute the calculations and comparison regardless of the filling state of the different tanks.

In an alternate embodiment, the system can utilize a pressure relief device for each storage tank ($PRD_H$, $PRD_M$, or $PRD_L$). Therefore, the calculations as described above in determining the dP/dt for each storage tank can execute. However, instead of taking the minimum value of the three tanks each value can be compared the PRD release rate for the corresponding storage tank. This can allow the use of different PRDs having a different set point for each storage tank.

The method of calculating the dP/dt and comparing the value to the PRD release rate as described above for the example can be utilized with a storage tank system having just a single tank or a plurality of tanks. In addition, the same method can be utilized for a storage tank system configured for a mobile application, for example, onboard hydrogen storage with in an automobile.

According to various embodiments, the system and method as described above can be utilized in storage tank systems storing gas at high pressure. The pressure of the gas within the storage tank can be compressed to pressure of about 5,000 psi, about 6,500 psi, about 7,500 psi, about 10,000 psi, about 12,500 psi, or greater than about 15,000 psi.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A method of detecting activation of a pressure relief device connected to a storage tank containing a pressurized gas comprising:
    calculating a pressure relief device release rate based on a set of inputs, wherein the set of inputs includes a storage tank volume, a pressure relief set point, an orifice size of the pressure relief device, a gas density, and a reseat point for the pressure relief device;
    monitoring the pressure within the storage tank and calculating a differential pressure reading over time;
    comparing the differential pressure reading over time to the pressure relief device release rate; and
    detecting a pressure relief device activation based on the comparison result.

2. The method of claim 1, wherein the calculation of the pressure relief device release rate is based on choked flow equations for the pressure relief device.

3. The method of claim 1, wherein calculating the differential pressure reading over time is repeated and the differential pressure values are averaged over time.

4. The method of claim 1, wherein the method further comprises activating a system alarm following detection of the pressure relief device activation.

5. The method of claim 1, wherein detecting the pressure relief device activation based on the comparison result comprises identifying when the differential pressure reading over time is greater than or equal to the pressure relief device release rate.

6. The method of claim 1, wherein calculating the pressure relief device release rate further comprises factoring in the position of a regulating device configured to discharge the pressurized gas during normal operation.

7. A controller for detecting activation of a pressure relief device connected to a storage tank containing a pressurized gas comprising a processor configured to receive a plurality of inputs of the pressure reading over time from a pressure transducer, calculate a differential pressure reading over time and compare the differential pressure reading over time to a pressure relief device release rate determined based on a set of inputs, and based on the comparison the controller detects whether a pressure relief device activation has occurred;
    wherein the pressure transducer is located upstream of the pressure relief device and the pressure within the storage tank is about greater than about 6,500 psi;
    wherein the set of inputs includes a storage tank volume, a pressure relief set point, an orifice size of the pressure relief device, a gas density, and a reseat point for the pressure relief device.

8. The controller of claim 7, further comprising a graphical user interface, a memory device, and a power source.

9. A system configured to detect pressure relief, comprising:
    at least one storage tank configured to contain a gas;
    a pressure transducer configured to read the pressure of the gas;
    a pressure regulating device configured to control the discharge of the gas during normal operation;
    a pressure relief device configured to activate and discharge the gas to prevent an over-pressurization of at least the storage tank; and
    a controller configured to receive the pressure reading over time from the pressure transducer, calculate a differential pressure reading over time and compare the differential pressure reading over time to a pressure relief device release rate determined based on a set of inputs, and based on the comparison the controller detects whether the pressure relief device has been activated;
    wherein the set of inputs includes the storage tank volume, a pressure relief set point, an orifice size of the pressure relief device, the gas density, and a reseat point for the pressure relief device.

10. The system of claim 9, wherein the controller further comprises a processor, a graphical user interface, a memory device, and a power source.

11. The system of claim 9, wherein the calculation of the pressure relief device release rate is based on choked flow equations for the pressure relief device.

12. The system of claim 9, wherein calculating the differential pressure reading over time is repeated and the results are averaged over time.

13. The system of claim 9, wherein the controller is further configured to activate a system alarm following detecting the pressure relief device activation, and the system alarm is configured to provide notification to at least the proper personnel or system to respond.

14. The system of claim 9, wherein the pressure relief device orifice cross-sectional area is greater than the cross-sectional area of the pressure regulating device.

15. The system of claim 9, wherein the controller is configured to factor in the position of a regulating device configured to discharge the pressurized gas during normal operation when calculating the pressure relief device release rate.

* * * * *